(12) United States Patent
Takeuchi et al.

(10) Patent No.: US 6,422,262 B1
(45) Date of Patent: *Jul. 23, 2002

(54) DISCHARGE DEVICE FOR RAW MATERIALS AND FUELS

(75) Inventors: Yukihisa Takeuchi, Aichi; Nobuo Takahashi, Owariasahi, both of (JP)

(73) Assignee: NGK Insulators, Ltd., Nagoya (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/336,927

(22) Filed: Jun. 21, 1999

(30) Foreign Application Priority Data

Jul. 3, 1998 (JP) .......................................... 10-188778

(51) Int. Cl.⁷ .................................................. F04F 1/00
(52) U.S. Cl. ...................... 137/207; 137/571; 137/587
(58) Field of Search ................................. 137/207, 571, 137/572, 896

(56) References Cited

U.S. PATENT DOCUMENTS

| | | | |
|---|---|---|---|
| 3,547,414 A | | 12/1970 | Nardi |
| 3,664,365 A | * | 5/1972 | Ralet et al. .................. 137/206 |
| 4,453,574 A | | 6/1984 | Elliott |
| 4,615,352 A | * | 10/1986 | Gibot ..................... 137/892 X |
| 4,938,789 A | * | 7/1990 | Tsuchiya et al. ......... 137/207 X |
| 4,982,578 A | * | 1/1991 | Heffner et al. .......... 137/544 X |
| 5,067,514 A | * | 11/1991 | Leemput et al. ............ 137/318 |
| 5,138,520 A | | 8/1992 | McMillan et al. |
| 5,141,847 A | * | 8/1992 | Sugimachi et al. . 137/624.13 X |
| 5,510,018 A | * | 4/1996 | Rey ...................... 137/572 X |
| 5,607,000 A | * | 3/1997 | Cripe et al. ............. 137/205 X |
| 5,865,206 A | * | 2/1999 | Steigman et al. ........... 137/114 |
| 5,871,028 A | * | 2/1999 | Liu ............................. 137/209 |

FOREIGN PATENT DOCUMENTS

JP 6-40030 2/1994

OTHER PUBLICATIONS

Patent Abstract of Japanese Patent Publication No. 03043700 dated Feb. 25, 1991.
Japanese Publication No. 3–43700 published on Feb. 25, 1991.

* cited by examiner

Primary Examiner—William C. Doerrler
Assistant Examiner—John Bastianelli
(74) Attorney, Agent, or Firm—Burr & Brown

(57) ABSTRACT

A device for discharging liquid such as raw materials and fuels capable of discharging liquid stably even under such conditions that the environment of a discharge space varies drastically and suddenly by adjusting discharge conditions to optimum ones according to fluctuation of surrounding environment is provided by controlling fluctuation in pressure in the buffer vessel 2 according to fluctuation in pressure in the mixing/reaction vessel 3 with installation of buffer vessel 2 and control means 10 between liquid discharge means 4 for mixing/reaction vessel 3 for discharged liquid, and the storage tank 1 for liquid to be discharged, and also by installing release means capable of releasing pressure in vessel 2 to surrounding atmosphere.

2 Claims, 1 Drawing Sheet

DISCHARGE DEVICE FOR RAW MATERIALS AND FUELS

BACKGROUND OF THE INVENTION AND RELATED ART STATEMENT

The present invention relates to a liquid discharge device usable for various machines which works by discharging raw materials or fuels in liquid or various machines that process materials or fuels in liquid by discharging them.

There has been hitherto known in certain fields, as a device discharging liquid as fine particles, an ink-jet discharge device such as, for example, one disclosed in JP-A-6-40030. However, since such a type of discharge device is utilized under relatively steady conditions with less variations in temperature, pressure, etc. of surrounding environment during the period of use, it is not exposed to drastic variations in operating conditions.

On the other hand, fine powders of various chemical substances are employed as auxiliary materials in manufacturing semiconductors, etc. Since a required level of fineness cannot be satisfied for powder only by mechanical crushing, the development of new methods for manufacturing powder have been aspirated. As one of these methods, it is urgently required to adopt a method that can supply raw materials in the form of fine particles to a reactor vessel such as a chamber for drying. At present, the realization of a device that can drop stably liquid in the form of particles having a diameter of from several hundred nanometers to the tens of micrometers range under a good control is strongly desired as a device adoptable in such a method.

In addition, there is a strong demand for the realization of devices capable of mixing thoroughly raw materials in a particular ratio so as to subject them to reaction for precise control of reaction, and the appearance of the technique capable of supplying fuels in the form of fine particles in various combustion apparatuses so as to further improve fuel efficiency.

In these types of apparatuses, a drastic change frequently occurs in the environment of a discharge space due to fluctuations of operating conditions, etc. during operation of the apparatuses. Presently, it is thus impossible to provide a device capable of supplying liquid in the form of desired fine particles irrespective of fluctuations in the environment of a discharge space.

SUMMARY OF THE INVENTION

It is an object of the present invention to provide a device for discharging liquid such as raw materials and fuels having such a structure that it can constantly adjust liquid discharge conditions according to fluctuations in surrounding environment, and discharge the liquid stably even under such conditions that the environment of a discharge space varies drastically and suddenly.

As a result of various investigations, taking into consideration the present situation mentioned above, the present inventors have found that the object of the present invention can be achieved by providing a buffer vessel 2, as means to cope with fluctuations in pressure in a mixing/reaction vessel 3 for discharged liquid, between liquid discharge means 4 to the mixing/reaction vessel 3, for example, a reactor and a storage tank 1 for liquid to be discharged; and a pressure control means 10 to control pressure in the mixing/reaction vessel 3, as means to control fluctuations in pressure in the mixing/reaction vessel 3, and release means 8 that can release pressure in the buffer vessel 2 to surrounding atmosphere, as means to control fluctuations in pressure in the buffer vessels 2 according to variations in pressure in the mixing/reaction vessel 3 between the buffer vessel 2 and the mixing/reaction vessel 3. The present invention has been completed on the above-mentioned findings.

DETAILED DESCRIPTION OF PREFERRED EMBODIMENT

Figure 1:
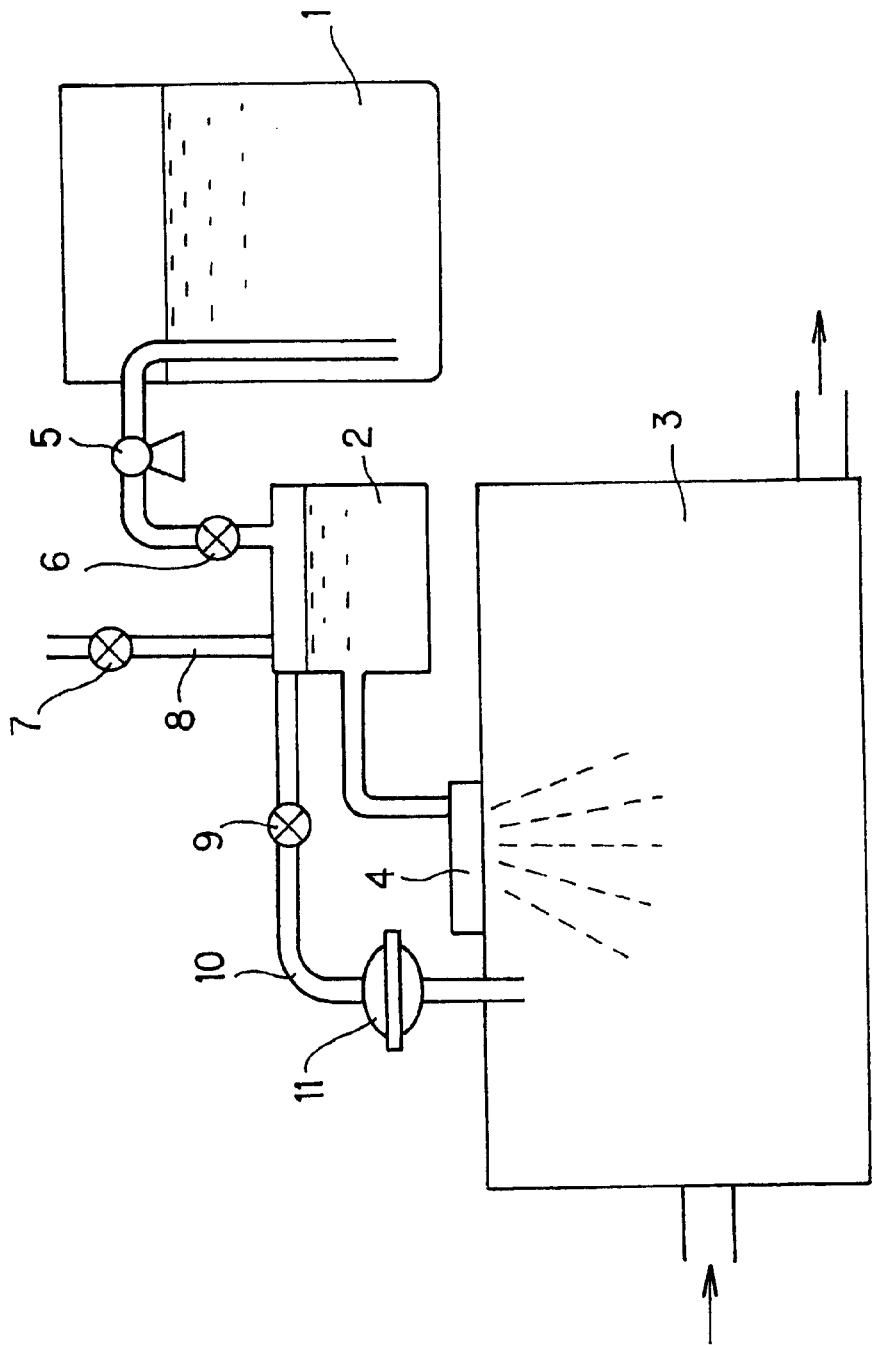
FIG. 1 is a view showing an arrangement of one embodiment of the discharge device for raw materials and fuels according to the present invention.

A discharge device for raw materials and fuels according to the present invention (sometimes referred to as a liquid discharge device hereinbelow) is a liquid discharge device comprising a discharge liquid storage tank 1, a buffer vessel 2 connected to the storage tank 1 via a valve 6, liquid discharge means 4, and a mixing/reaction vessel 3 to receive discharged liquid and to exert objective effects, characterized in that means 10 to control pressure in the mixing/reaction vessel 3 is provided between the mixing/reaction vessel 3 and the buffer vessel 2 in order to maintain the relation between pressure in the reactor 3 and pressure in the buffer vessel 2 at constant. A pump 5 may be provided between the storage tank 1 and the valve 6 if required. Preferably, the pump 5 has a function to control the pressure of liquid supplied within a predetermined range.

Although the shape, size, etc. of the buffer vessel 2 may be chosen depending upon the purpose of use, etc., there is no limitation for them so long as the function of controlling pressure for supplying liquid to the liquid discharge means 4 is not disturbed. Materials for the buffer vessel 2 may be optionally selected, in accordance with the purpose of use, physicochemical properties of discharge liquid, etc.

Liquid temperature control means may be provided to the buffer vessel 2, if required.

For the control valve 5 provided between the buffer vessel 2 and the liquid storage tank 1, a non-return valve with a function capable of controlling a level of liquid in the vessel 2 is generally employed.

The buffer vessel 2 may be connected to the discharge means 4 via a connecting path such as a tube.

As discharge means, a liquid-drop discharge device described in copending U.S. application Ser. No. 09/217,041 can be employed. As a reference, the description of copending U.S. application Ser. No. 09/217,041 specification is herein incorporated. More specifically, a liquid-drop discharge device disclosed in FIG. 5 of the above-mentioned patent application is suitably employed. A diameter of discharge ports provided to the discharge means is generally in the range of several micrometers to the tens of micrometers, which may be formed by techniques such as laser processing and mechanical methods such as punching. The number of discharge ports may be properly chosen, depending upon the applications.

In terms of heat-resistance, chemical-resistance, solvent-resistance, etc., ceramic materials are suitable for forming the discharge means 4.

For the mixing/reaction vessel 3 for discharged liquid, not only the size, shape, etc. but also materials to be employed are chosen depending upon the applications. For example, if the liquid discharge device according to the present invention is employed in a reaction device for a gas-phase reaction, etc., a stainless steel vessel or a vessel with an inner surface lined with glass and the like is employed as the mixing/reaction vessel 3. If the liquid discharge device is a chamber for drying liquid, stainless steel members are generally employed. In case of combustion furnaces, those manufactured from refractory ceramics, high-temperature resistant metal materials, and the like are suitably employed.

The pressure control means 10 to control pressure in the mixing/reaction vessel 3 provided between the mixing/reaction vessel 3 and the buffer vessel 2 in order to maintain the relation between pressure in the mixing/reaction vessel 3 and pressure in the buffer vessel 2 at constant is a system that may have an element (not depicted) capable of monitoring changes in the environment, particularly in pressure in the mixing/reaction vessel 3. The system is provided with a control valve 9 to enable change of pressure according to changes in pressure in the mixing/reaction vessel 3 and can adjust the pressure in the buffer vessel 2 to the same level of pressure as in the mixing/reaction vessel 3 by opening the valve 9. In addition, it is preferable to provide a predetermined diaphragm 11 between the mixing/reaction vessel 3 and the buffer vessel 2 in order to prevent contamination or backflow of reaction gas.

It is preferable to provide means that can release the pressure in the buffer vessel 2 to urgently reduce the pressure in the buffer vessel 2 to that of the surrounding environment of operation, in preparation for the occurrence of abnormal events. This means may be optionally employed to release the pressure in the vessel 2 according to operational status. As such means, a release system 8 having a valve 7 for releasing is preferably attached to the upper part of the buffer vessel 2.

An example of operation of the liquid discharge device of the present invention will be described referring to FIG. 1 showing an arrangement of one embodiment of the liquid discharge device according to the present invention.

A liquid discharge device shown in FIG. 1 was employed to manufacture ceramic powder with an even particle size distribution. Zirconia was employed as a ceramic material. It was mixed with an appropriate auxiliary agent to impart a flow property to prepare a slurry. This slurry was discharged using the liquid discharge device shown in FIG. 1 to a heat and dry vessel 3, into which hot air was being blown. Binders contained in the slurry were hardened and dried to solidify the slurry containing zirconia. The solidified particles were recovered and passed through a heat decomposition furnace to obtain zirconia with a desired particle size.

In the course of this operation, in order to test the operating status of the control valve 9, the quantity of hot air supplied by a blower was forced to increase to elevate pressure in the vessel 3. When air was continuously blown with the control valve 9 closed, discharge of slurry from the nozzle was stopped when the inner pressure of the vessel 3 exceeded a certain level. When air supply was immediately terminated and again started after releasing the control valve 9, discharge of the slurry was started again.

On the other hand, when the control valve 9 remained open and hot air was supplied by changing the quantity of gas blown in the range of level to elevate pressure in the vessel 2, no large influence was observed on discharge conditions.

It was found that the discharge device according to the present invention can be controlled adequately and is useful as a stable liquid discharge device.

According to the discharge device for raw materials and fuels of the present invention, the pressure in the mixing/reaction vessel 3 can be easily and steadily adjusted, and stable discharge conditions can be maintained according to the changes in operating environment.

What is claimed is:

1. A device for discharging liquid comprising:
   a storage tank for holding a liquid;
   a buffer vessel;
   a first line connecting said storage tank to said buffer vessel;
   a mixing/reaction vessel;
   a second line providing fluid pressure communication between said buffer vessel and said mixing/reaction vessel, wherein said second line includes pressure control means;
   a positively driven discharge device for discharging liquid into the mixing/reaction vessel; and
   a third line for discharging liquid into said mixing/reaction vessel through said discharge device, said third line connecting said discharge device to said buffer vessel, said third line being a sole inlet line for said discharge device to supply liquid to said discharge device.

2. The device according to claim 1, further comprising a release mechanism for releasing pressure in the buffer vessel to the surrounding atmosphere.

* * * * *